United States Patent
Nagaya

[11] Patent Number: 5,200,584
[45] Date of Patent: Apr. 6, 1993

[54] LEVER SWITCH
[75] Inventor: Masami Nagaya, Aichi, Japan
[73] Assignee: Kabushiki Kaisha Tokai Rika Denki Seisakusho, Aichi, Japan
[21] Appl. No.: 727,685
[22] Filed: Jul. 10, 1991
[30] Foreign Application Priority Data
Jul. 18, 1990 [JP] Japan .................................. 2-76182
[51] Int. Cl.$^5$ .............................................. H01H 9/00
[52] U.S. Cl. .................................. 200/4; 200/61.54
[58] Field of Search ............. 200/4, 6 A, 16 A, 61.27, 200/61.28, 61.54, 276, 277, 332, 335, DIG. 39
[56] References Cited
U.S. PATENT DOCUMENTS
3,793,491 2/1974 Cryer .................................. 200/18
4,328,431 5/1982 Usami .............................. 307/10 R
4,782,200 11/1988 Oba .................................. 200/16 A Primary Examiner—A. D. Pellinen
Assistant Examiner—Michael A. Friedhofer
Attorney, Agent, or Firm—Finnegan, Henderson, Farabow, Garrett & Dunner

[57] ABSTRACT

A lever switch comprises first and second fixed contact portions mounted on an insulator disposed in a casing a lever rotatively mounted rotatable on the casing; and first switching device for connecting the first contact portion and second contact portion by rotary operation of the lever, wherein the switching device includes a coil body supported to the lever, and two contacts which are formed by extending both end portions.

8 Claims, 3 Drawing Sheets

LEVER SWITCH

BACKGROUND OF THE INVENTION

This invention relates to a lever switch in which a conductive material held at the end of a lever is moved into and out of engagement of first and second stationary contacts.

There is available a lever switch such as a wiper and washer switch assembly installed on the steering column of an automobile. In the assembly, the wiper switch takes a plurality of positions with its lever swung vertically, and the washer switch is turned on and off with the same lever pushed forwardly and backwardly.

In FIGS. 5 through 7, reference numeral 1 designates a casing mounted on a steering column (not shown). The casing 1 has a cylindrical portion 2 at the center into which a steering shaft is inserted. Reference numeral 3 designates a wiper switch which comprises: a plurality of stationary contacts 5 provided on an insulator 4; and a movable contact 8 which is held in a contact holder 6 through a spring 7 so that it is slid on the upper surfaces of the stationary contacts 5. Reference numeral 9 designates a bracket which has a shaft 9a. The shaft 9a is inserted into a hole la formed in the casing 1, so that the bracket is swung vertically or in the direction of the arrow A and in the opposite direction. Reference numeral 10 designates a lever having a pin 10a in the base portion. The pin 10a is engaged with a hole formed in the bracket 9, so that the lever 10 is swung forwardly and backwardly, or in the direction of the arrow B and in the opposite direction. Reference numeral 11 designates a washer switch provided in the casing 1. The washer switch 11 comprises: a stationary contact 12 provided on the insulator 4; a movable contact piece 14 made of a leaf spring one end portion of which is secured to the insulator 4 with a rivet 13; and a movable contact 15 which is provided on the other end portion of the movable contact piece 14 so that it is brought into and out of engagement with the stationary contact 12. The end portion of the lever 10 is engaged with a fork-shaped engaging portion 6a formed on the top of the contact holder 6. Therefore, as the lever 10 together with the bracket 9 is turned in the direction of the arrow A, the contact holder 6 is slid so that the wiper switch 3 is set to positions OFF, INT, LO and HI. A rod 16 is connected to the lever 10 at the middle in correspondence to the movable contact piece 14, and a push piece 18 is coupled through a spring 17 to the end of the lever 10. The push piece 18 is pushed against a stepping recess 19 formed in the casing 1. More specifically, when, at each position of the wiper switch, the lever 10 is turned in the direction of the arrow B to slide the push piece 18 from the original position 19a to the action position 19b of the stepping recess 19, the rod 16 of the lever 10 pushes the movable contact piece 14, so that the movable contact 15 is brought into contact with the stationary contact 12; that is, the washer switch 11 is turned on. When, under this condition, the lever 10 is turned in the direction opposite to the direction of the arrow B, the movable contact piece 14 is restored by its own elastic force, so that the movable contact 15 is disengaged from the stationary contact 12; that is, the washer switch 11 is turned off.

The conventional washer switch 11 thus constructed suffers from the following difficulties:

(1) In order to form the washer switch, it is necessary to use a number of components such as the stationary contact 12, the rivet 13, the movable contact piece 14, the movable contact 15, and the rod 16.

(2) The washer switch is unavoidably bulky as a whole. In order to turn on the washer switch, first the rod 16 is lowered until it contacts the movable contact piece 14, and then the rod 16 is further lowered to deflect the movable contact piece 14, as a result of which the movable contact 15 is brought into contact with the stationary contact 12. Hence, the stroke of the rod 16; that is, the stroke of the lever 10 is relatively large. Because of this large stroke, the washer switch is unavoidably bulky.

(3) Whenever the washer switch is turned on, a great depressing force is applied to the movable contact piece to bend the latter, so that the movable contact piece is liable to be deteriorated quickly. In addition, whenever the switch is turned on, the movable contact 15 is struck against the stationary contact 12, so that these contacts 12 and 15 are also liable to be deteriorated quickly.

(4) Whenever the washer switch is turned on, the contacts 12 and 15 produce a strike sound.

SUMMARY OF THE INVENTION

In view of the foregoing, an object of this invention is to provide a lever switch which is small in the number of components and accordingly small in size, and in which the deterioration of the components is suppressed, and, when it is turned on, the production of the strike sound is decreased as much as possible.

The foregoing object of the invention has been achieved by the provision of a lever switch which, according to the invention, comprises: first and second stationary contacts mounted on a casing; a lever mounted rotatably on the casing; and a conductive member including an elastic coil, and contacts which are formed by using both end portions of the coil, the lever being operated so as to move said contacts of said conductive member into and out of engagement with said first and second stationary contacts.

The lever switch of the invention, being made up of the first and second stationary contacts and the conductive member, is smaller in the number of components than the conventional lever switch. Furthermore, since the contacts of the conductive member are moved directly into and out of engagement with the first and second stationary contacts, the stroke of the lever is shorter than in the conventional lever switch, thus allowing a reduction in size of the lever switch. Since the coil forming the conductive member is elastic, the contacts of the conductive members are elastically brought into contact with the first and second stationary contacts. Hence, the deterioration of the conductive member and the first and second stationary contacts can be suppressed which is due to the striking of the contacts of the conductive member hard against the first and second stationary contacts, and, when the switch is turned on, the production of a strike sound is substantially prevented.

DETAILED DESCRIPTION OF THE PREFERRED EMBODIMENTS

One example of a wiper and washer switch to which the technical concept of the invention is applied, constituting one embodiment of the invention, will be described with reference to FIGS. 1 through 4.

Figure 1:
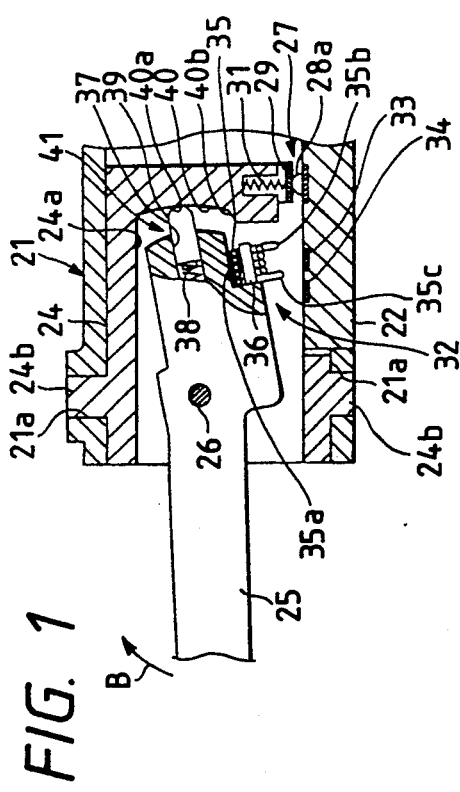
FIG. 1 is a sectional bottom view showing a part of the wiper and washer switch assembly according to the invention.
Figure 2:
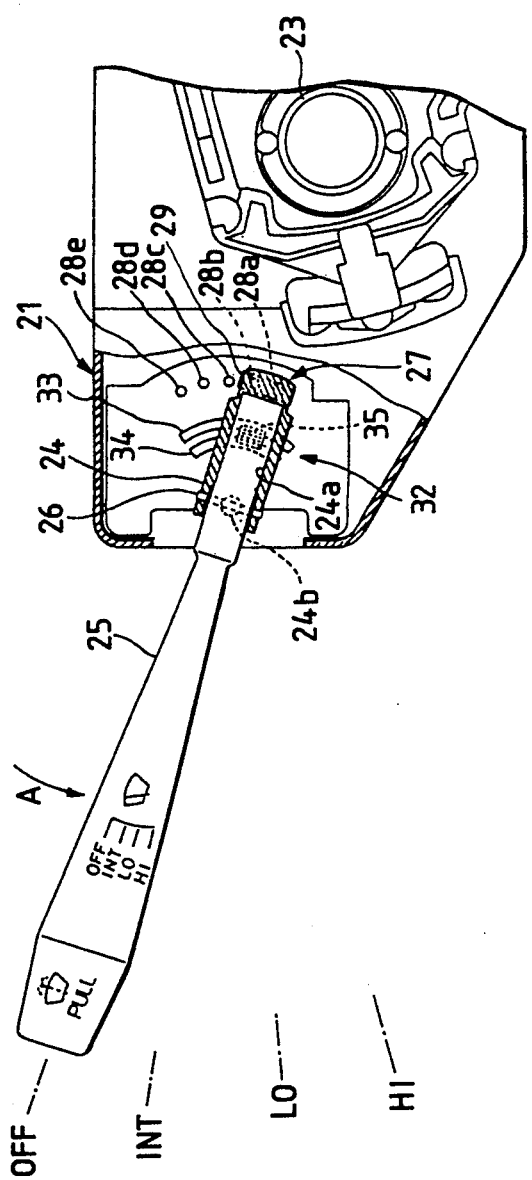
FIG. 2 is a front view, with parts cut away, showing the wiper and washer switch assembly.

In FIGS. 1 and 2, reference numeral 21 designates a casing mounted on a steering column (not shown). An insulator 22 is engaged with an opening formed in the lower surface of the casing 21. The casing has a cylindrical portion 23 at the center into which a steering shaft (not shown) is inserted. Reference numeral 24 designates a bracket having an accommodating chamber 24a opened downwardly. Shafts 24b and 24b are protruded from the front and rear surfaces of the bracket respectively, and are engaged with holes 21a and 21a formed in the casing 21 respectively so that the bracket can be turned in the direction of the arrow A and in the opposite direction. Reference numeral 25 designates a lever whose one end portion is inserted in the accommodating chamber 24a. The lever has a pin 26 protruded from its base. The pin 26 is supported by the bracket 24 so that the lever can be turn in the direction of the arrow B perpendicular to the direction of the arrow A and in the opposite direction. When the lever 25 together with the bracket 24 is turned in the direction of the arrow A or in the opposite direction, the lever is moved stepwise by a stepping mechanism (not shown).

Figure 3:
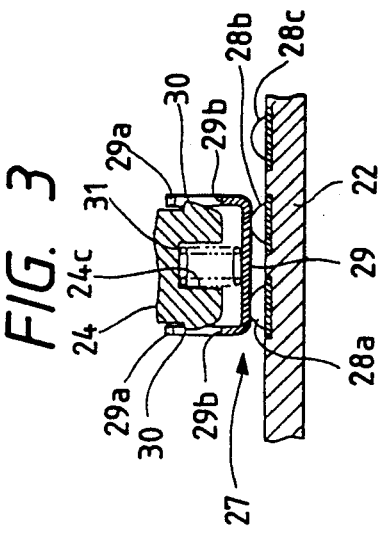
FIG. 3 is a cross sectional view of a wiper switch in the assembly.
Figure 4:
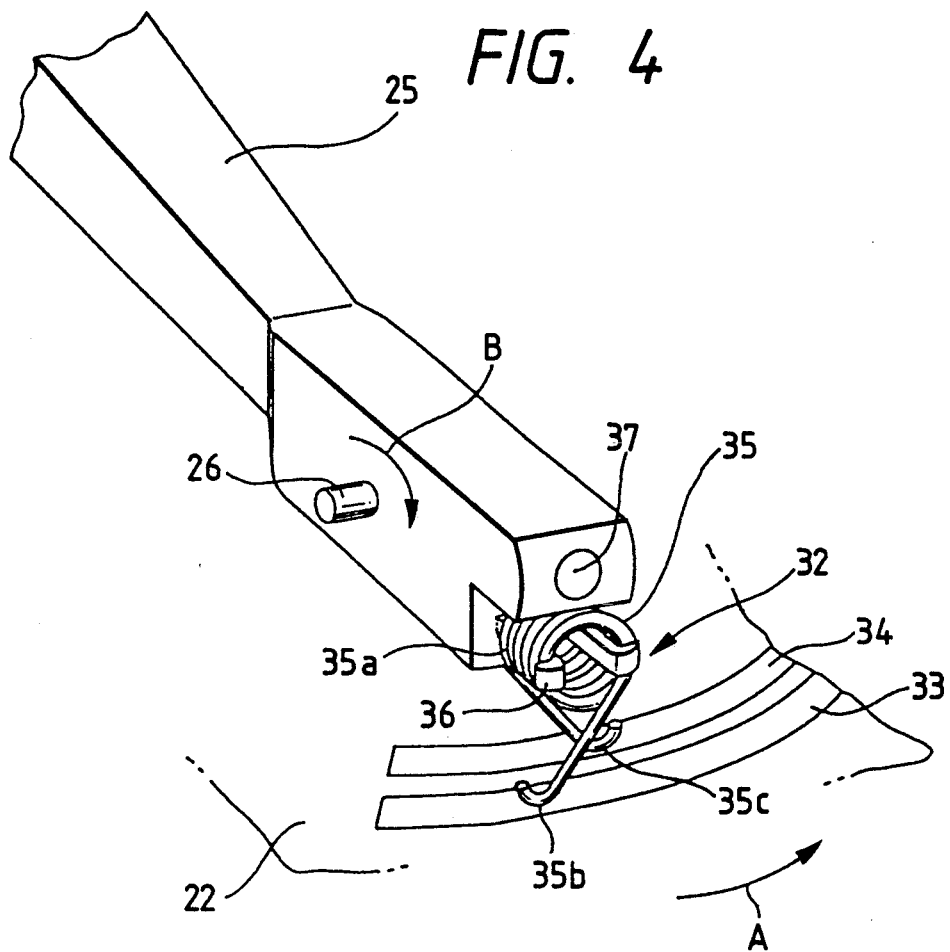
FIG. 4 is a perspective view of a washer switch in the assembly.

Further in FIGS. 1 and 2, reference numeral 27 designates a first switch of slide type, namely, a wiper switch mounted on the casing. The wiper switch 27 comprises: a plurality of stationary contacts, for instance five stationary contacts 28a through 28e, mounted on the insulator 22; and a movable contact piece 29 mounted on the end of the bracket 24. The movable contact piece 29 is U-shaped as shown in FIG. 3, and has elongated holes 29b and 29b formed in its risers 29a and 29a. The elongated holes 29b are engaged with protrusions 30 and 30 formed on both sides of the bracket 24, respectively, so that the movable contact piece is movable. A spring 31 is inserted in a recess 24c formed in the bracket 24, so that the movable contact piece 29 is pushed against two of the stationary contacts 28a through 28e. Reference numeral 32 designates a second switch of confront type, namely, a washer switch. The washer switch 32 comprises: first and second arcuate contacts 33 and 34 which are coaxially mounted on the insulator 22; and a conductive member 35 which is moved into and out of engagement with those first and second arcuate contacts 33 and 34. The conductive member 35, as shown in FIG. 4, is a coil of spring steel which comprises: a coil body 35a having both end portions which are extended; and two contacts 35b and 35c are formed by arcuately bending both tip portions of extended end portions of the coil body 35a. The coil body 35a is supported by engaging means 36 consisting of two engaging pawls protruded from the lever 25.

A circular recess 37 is formed in the end portion of the lever 25. A push piece 39 is inserted through a spring 38 into the circular recess 37 in such a manner that it is pushed against a stepping recess 40 formed in the bracket 24, thus forming the aforementioned stepping mechanism.

The operation of the lever switch thus constructed will be described.

First, the wiper switch 27 will be described with reference to FIGS. 2 and 3. When the wiper switch is positioned at "OFF", the movable contact piece 29 is in contact with the stationary contacts 28a and 28b. As the wiper switch 27 is positioned at "INT", "LO" and "HI" successively with the lever 25 turned downwardly or in the direction of the arrow A, the movable contact piece 29 is slid on the stationary contacts 28a through 28e, so that the stationary contacts 28b and 28c, 28c and 28d, 28d and 28d are short-circuited successively.

Now, the washer switch 32 will be described with reference to FIGS. 1 and 4. Normally, the push piece 39 of the lever 25 is abutted against the original position of the stepping recess; that is, the conductive member 35 is in disengagement from the first and second stationary arcuate contacts 33 and 34; that is, the washer switch is held turned off. When the lever 25 is turned forwardly, or in the direction of the arrow B, the push piece 39 is moved from the original position 40a toward the action position 40b, while the conductive member 35 is moved backwardly. When the lever 25 is further turned in the same direction until the push piece 39 comes to the action position 40b of the stepping recess 40, the contacts 35b and 35c of the conductive member 35 are brought into contact with the first and second stationary arcuate contacts 33 and 34, respectively; that is, the first and second stationary arcuate contacts 33 and 34 are short-circuited with the conductive member 35, so that the washer switch 32 is turned on (cf. FIG. 4).

The lever switch thus constructed has the following effects or merits:

As was described above, the washer switch 32 is made up of the first and second stationary contacts 33 and 34 mounted on the insulator 22; and the conductive member 35 which is mounted on the end of the lever 25 so as to be moved into and out of engagement with the stationary contacts 33 and 34. Hence, the washer switch 32 is smaller in the number of components and accordingly lower in manufacturing cost than the conventional one. Furthermore, since the conductive member 35 comprises the elastic coil body 35a, and the contacts 35b and 35c which are formed by bending both end portions of the coil body 35a in such a manner that the contacts 35b and 35c are brought directly in contact with the stationary contacts 33 and 34, respectively. Therefore, when the washer switch is turned on, the stroke of the lever 25 is shorter than in the case of the conventional lever switch. In addition, since the coil body 35a of the conductive member 35 is elastic, when the lever 25 is turned the contacts 35b and 35c of the conductive member 35 are elastically brought into contact with the stationary contacts 33 and 34. This construction eliminates the difficulty that otherwise the conductive member 35 and the stationary contacts 33 and 34 are deteriorated being struck hard against one another or being greatly bent. In this case, the production of a strike sound is substantially prevented.

Figure 5:
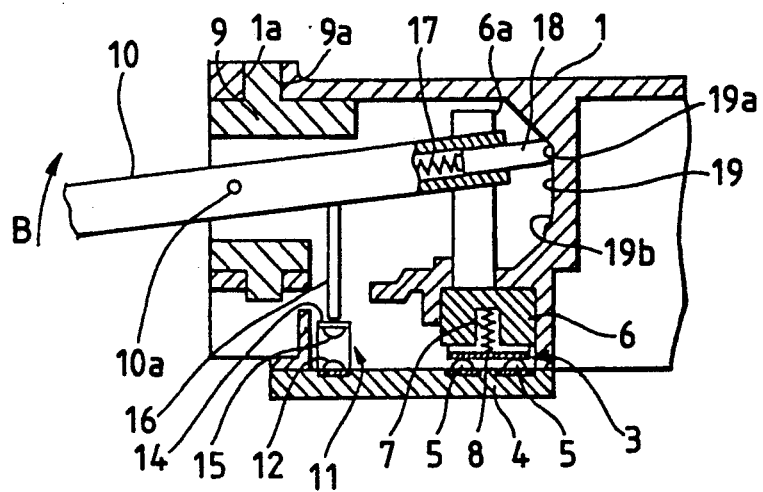
FIG. 5 is a sectional bottom view showing a part of the conventional wiper and washer switch assembly.
Figures 6, 7:
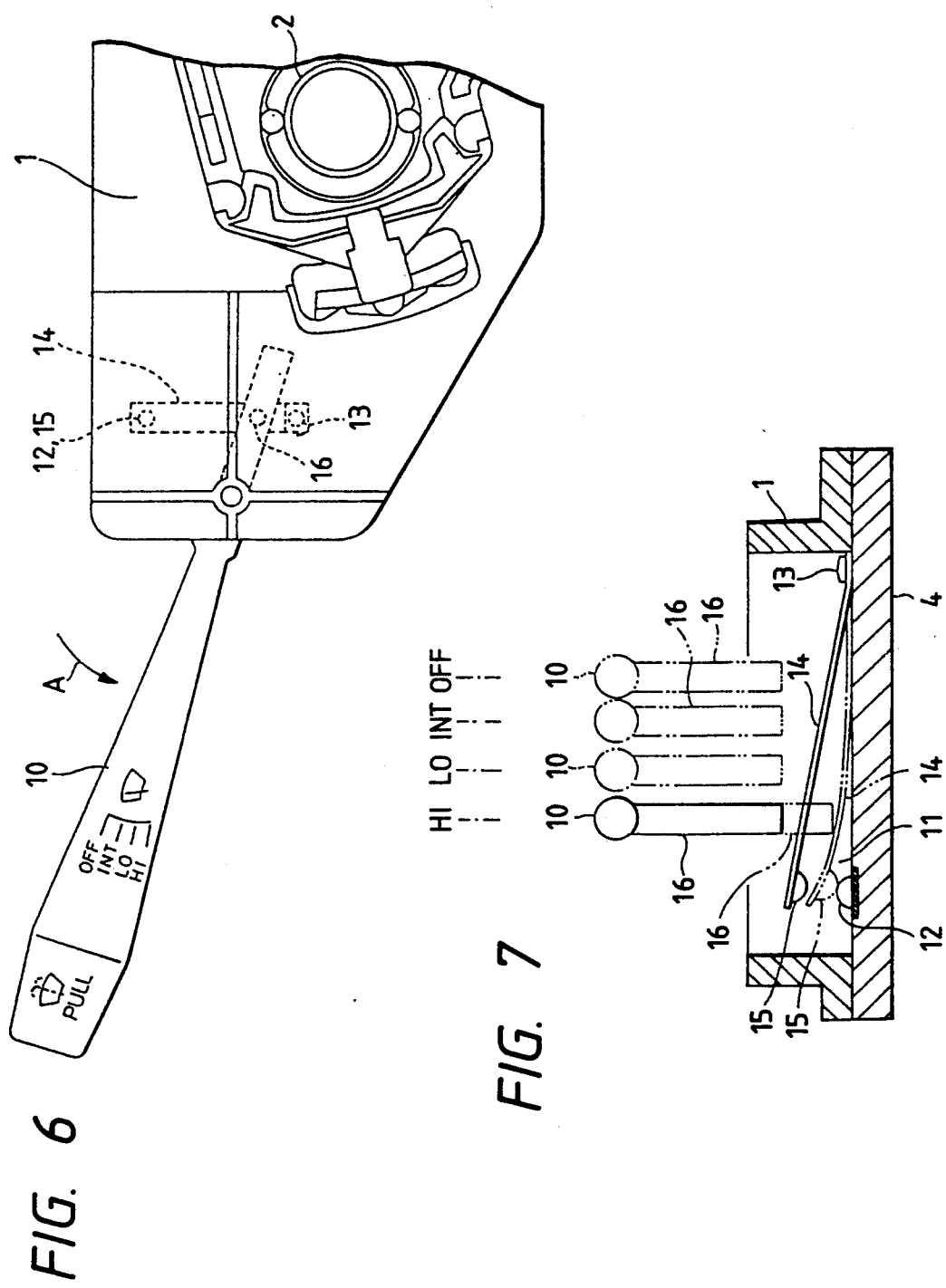
FIG. 6 is a front view of the conventional wiper and washer switch assembly.
FIG. 7 is a sectional view for a description of the relationships between a movable contact piece and a rod of the conventional wiper.

In the conventional wiper and washer switch assembly shown in FIGS. 5 through 7, the wiper switch 3 is of slide type. In order to improve the sliding characteristic of the wiper switch 3, grease is applied to the movable contact 8. If the grease is splashed to the stationary contact 12 or the movable contact 15 of the washer switch 11, then the following difficulty may be involved: That is, even if the movable contact 15 is pushed against the stationary contact 12, because of the grease the former 15 may not be electrically connected to the latter 12; that is, the switch may not be turned on. On the other hand, in the lever switch of the invention, when the contacts 35b and 35c of the conductive member 35 are brought into contact with the stationary contacts 33 and 34, the elasticity of the coil body 35a causes the contacts 35b and 35c to slide away from each other; that is, the contacts 35b and 35c perform a so-called "wiping action". Hence, even when the grease applied to the wiper switch 27 of slide type is splashed to the stationary contacts 33 and 34 of the washer switch 32 of confront type, or to the contacts 35b and 35c of the conductive member 35, the wiping action removes the grease, whereby the contacts 35b and 35c of the conductive member 35 are electrically sufficiently connected to the stationary contacts 33 and 34; that is, the switch is positively turned on.

In the conventional lever switch, when the lever 10 is turned in the direction of the arrow B which is set at any one of the positions OFF, INT, LO and HI as shown in FIG. 7, it is necessary for the rod 16 to depress the movable contact piece 14 of the washer switch 11 thereby to bring the movable contact 15 into contact with the stationary contact 12. In this operation, the lever 10 is swung a predetermined stroke so that the push piece 18 is moved from the original position 19a to the action position 19b in the stepping recess 19. Accordingly, in swinging the lever 10; that is, in moving the rod 16, the stroke is so determined that, with the lever 10 set at the position OFF, the movable contact 15 formed on the movable contact piece 14 is positively brought into contact with the stationary contact 12. Accordingly, when compared with the stroke of the rod in an ordinary switch of confront type in which the rod is adapted to depress the middle of the movable contact piece, the stroke of the rod 16 is necessarily long, thus making the lever switch bulky. In addition, as the lever 10 is shifted to the positions INT, LO and HI in the stated order, the force applied to the movable contact piece 14 through the rod 16 is increased more than required, so that the movable contact piece 14 is deformed increasingly more than required, thus being deteriorated quickly. On the other hand, in the lever switch of the invention, with the lever 25 set at any one of the positions OFF, INT, LO and HI, the distance between the contacts 35b and 35c of the conductive member 35 and the stationary contacts 33 and 34 is maintained unchanged. Accordingly, the stroke for swinging the lever 25 can be set to a minimum value, and the lever switch can be miniaturized as much. For the same reason, the conductive member 33 is not bent more than required, with the result that the deterioration is suppressed more.

In the above-described embodiment, the technical concept of the invention is applied to a wiper and washer switch assembly for an automobile; however, the invention is not limited thereto or thereby. That is, the technical concept of the invention is applicable to all lever switches in which the lever is turned only in predetermined directions (for instance in the direction of the arrow B and in the opposite direction, and the contact of the conductive member is brought into contact with first and second stationary contacts.

In the lever switch according to the invention, the conductive member which is the elastic coil with both end portions formed into the contacts is mounted on the end of the lever, and the lever is operated so as to bring the contacts of the coil into contact with the first and second stationary contacts. Owing to this construction, the lever switch is smaller in the number of components, and small in size. Furthermore, for the same reason, the deterioration of the components is suppressed, and, when the switch is turned on, a strike sound is scarcely produced. These effects should be highly appreciated.

What is claimed is:

1. A lever switch comprising:
   first and second fixed contact portions mounted on an insulator disposed in a casing;
   a lever rotatively mounted on said casing; and
   first switching means for connecting said first contact portion and second contact portion by rotary operation of said lever, wherein said switching means includes a coil body supported by said lever said coil having two end portions, and two contacts which are formed by extending both end portions.

2. A lever switch as, claimed in claim 1, wherein said lever is rotatable with respect to said casing through a bracket which is rotatively disposed in said casing.

3. A lever switch as claimed in claim 1, wherein said contacts of extended end portions have arcuately bent tip portions.

4. A lever switch as claimed in claim 2, wherein an axis of lever is perpendicular to that of said bracket.

5. A lever switch as claimed in claim 2, wherein said coil body is supported by an engaging portion having two engaging pawls protruding from one end portion of said lever.

6. A lever switch as claimed in claim 1, wherein said first and second contact portion have arcuate shapes and are coaxially mounted on said insulator.

7. A lever switch as claimed in claim 2, further comprising:
   a plurality of stationary contacts circumferentially mounted on said insulator; and
   second switching means, for rotatably sliding on said stationary contacts to connect two of said stationary contacts by rotary operation of said bracket, mounted on said bracket.

8. A lever switch as claimed in claim 7, said second switching means is U-shaped contact piece, and includes:
   elongated holes formed on risers of said contact piece;
   protrusions formed on both sides of said bracket, and engaged with said elongated holes, respectively;
   a spring inserted into a recess formed in said bracket to push said contact piece against two of said stationary contacts.

* * * * *

UNITED STATES PATENT AND TRADEMARK OFFICE
CERTIFICATE OF CORRECTION

PATENT NO. : 5,200,584
DATED : April 06, 1993
INVENTOR(S) : Masami Nagaya

It is certified that error appears in the above-indentified patent and that said Letters Patent is hereby corrected as shown below:

Abstract, Title Page, line 2, after "casing" insert --,--.

Claim 1, column 6, line 27, after "said lever" insert --,--.

Claim 6, column 6, line 43, change "portion" to --portions--.

Signed and Sealed this

First Day of March, 1994

BRUCE LEHMAN

Attest:

Attesting Officer

Commissioner of Patents and Trademarks